(12) United States Patent
Gale

(10) Patent No.: US 11,334,879 B2
(45) Date of Patent: *May 17, 2022

(54) METHOD AND SYSTEM FOR DIGITAL PAYMENT INSTRUMENT DEPLOYMENT OF AUTHENTICATION SEAL

(71) Applicant: 1191212 B.C. LTD., Vancouver (CA)

(72) Inventor: Joshua Gale, Toronto (CA)

(73) Assignee: 1191212 B.C. LTD., Vancouver (CA)

( * ) Notice: Subject to any disclaimer, the term of this patent is extended or adjusted under 35 U.S.C. 154(b) by 307 days.

This patent is subject to a terminal disclaimer.

(21) Appl. No.: 16/791,326

(22) Filed: Feb. 14, 2020

(65) Prior Publication Data

US 2021/0256515 A1 Aug. 19, 2021

(51) Int. Cl.
*G06Q 20/38* (2012.01)
*H04L 9/06* (2006.01)

(52) U.S. Cl.
CPC ..... *G06Q 20/3821* (2013.01); *G06Q 20/3823* (2013.01); *G06Q 20/3827* (2013.01); *H04L 9/0637* (2013.01)

(58) Field of Classification Search
CPC ........... G06Q 20/3821; G06Q 20/3823; G06Q 20/3827; H04L 9/0637; H04L 9/3239; H04L 2209/38; H04L 2209/56
USPC .......................................................... 705/76
See application file for complete search history.

(56) References Cited

U.S. PATENT DOCUMENTS

| | | | | |
|---|---|---|---|---|
| 2019/0095909 A1* | 3/2019 | Wright | ................ | G06Q 20/389 |
| 2020/0117690 A1* | 4/2020 | Tran | ................ | G06F 16/90332 |
| 2021/0375408 A1* | 12/2021 | Krueger | .............. | G06F 16/9566 |

OTHER PUBLICATIONS

BIP 0120, retrieved from https://en.bitcoin.it/wiki/BIP_0120, 6 pages, Jul. 28, 2015 (Year: 2015).*

* cited by examiner

*Primary Examiner* — James D Nigh

(57) ABSTRACT

Computer-implemented method and system of transacting a digital payment instrument deploying an authentication seal. The method includes receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record; associating at least one of the currency data record, the R-ID, the R-HSH and a payor agent signature with a unique identifier (B-ID) of a location within an immutable storage medium, the payor agent signature based on at least one of the payor agent signing key and the payor agent verification key; and transmitting, to the payor agent, an authentication seal in unique association with the currency data record, the authentication seal being generated, based at least in part upon the at least one of the currency data record and the R-ID, the R-HSH and the B-ID.

20 Claims, 3 Drawing Sheets

300

Receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record  310

Associating, using one or more processors, at least one of the currency data record, the R-ID, the R-HSH and a payor agent signature with a unique identifier (B-ID) of a location within an immutable storage medium, the payor agent signature based on at least one of the payor agent signing key and the payor agent verification key  320

Transmitting, to the payor agent, an authentication seal in unique association with the currency data record, the authentication seal being generated, using the one or more processors, based at least in part upon the at least one of the currency data record and the R-ID, the R-HSH and the B-ID  330

METHOD AND SYSTEM FOR DIGITAL PAYMENT INSTRUMENT DEPLOYMENT OF AUTHENTICATION SEAL

TECHNICAL FIELD

The disclosure herein relates to digital data record authentication in immutable transactions.

BACKGROUND

Financial payment instruments including checks require clearing and verification of collateral, a process subject to inherent delays. Additionally, networks for transmitting digital payments instruments and related information may not be secure enough for transmitting digital payment instruments, despite development of fault tolerant architectures and new encryption methods. Electronic seals are used for securing data and documents originating from payment service providers. Documents protected with an electronic seal can be preserved as evidence that will be independent of the system with which it was created. An electronic seal in communication between payment services enhances trust between transferor and transferee parties for securing claims and transactions.

BRIEF DESCRIPTION OF THE DRAWINGS

FIG. 3 illustrates a method of operation, in one example embodiment, of generating and transmitting an authentication seal deployable with a digital payment instrument.

DETAILED DESCRIPTION

Figure 1:
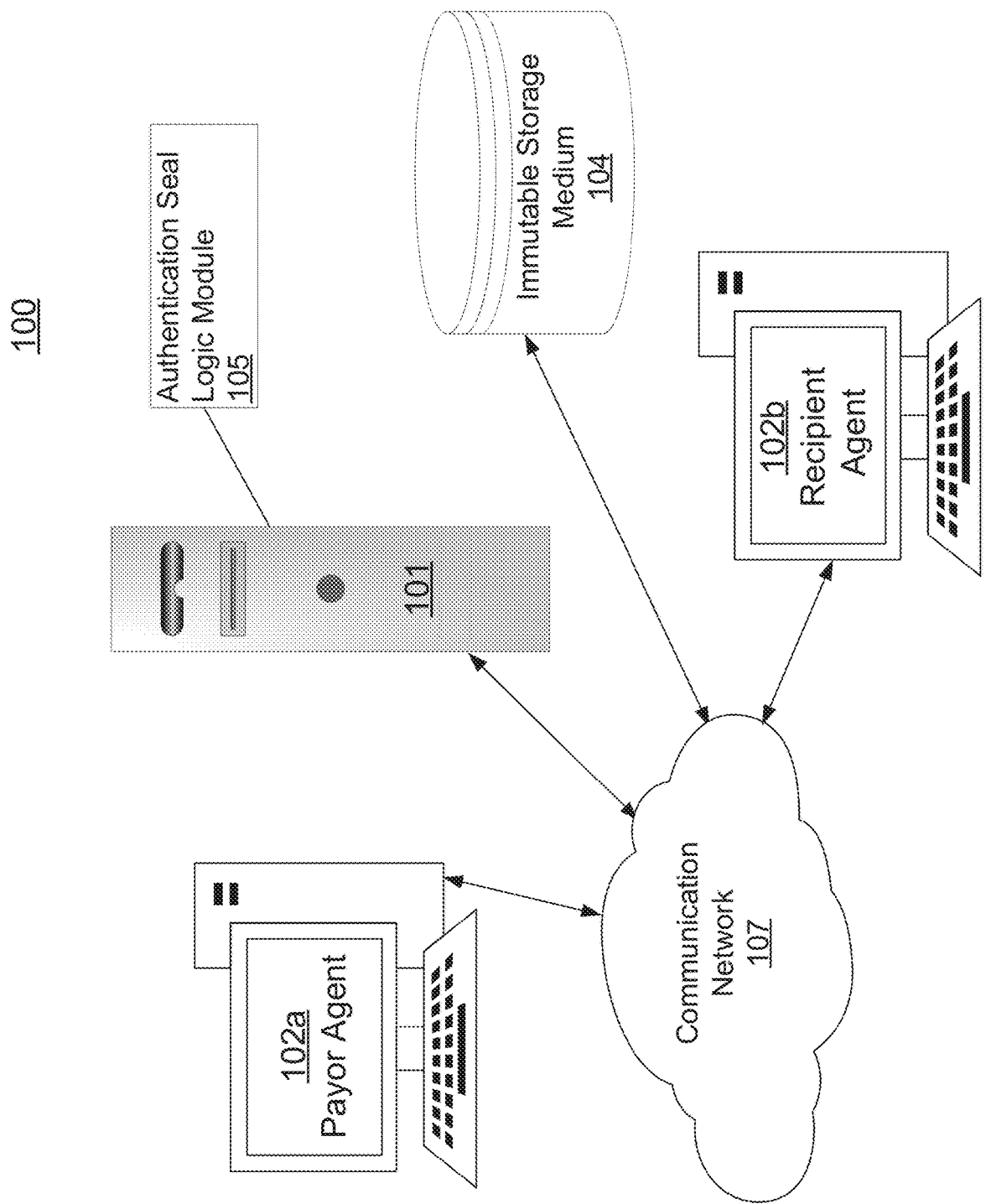
FIG. 1 illustrates, in an example embodiment, a system for generating an authentication seal.

Methods and systems provided herein, among other advantages, eliminate or minimize delays and uncertainties associated with typical check clearing activities associated with currency payments transfer transactions, by way of a generated authentication seal associated with a given digital currency data record. In particular, solutions provided herein also provide for broadcasting the authentication seal in association with the given currency data record for successive payments, the authentication seal providing traceability, and integrity in regard to a given currency data record as established in an immutable medium. Other benefits provided herein include a digital payment instrument that is tamper-proof, non-repudiable, unique (the same record id never being used for a different instance), and verifiably authentic (identities are represented by their signing/verification keys), while eliminating or minimizing a need for a transfer-related clearing process.

Embodiments herein recognize that an immutable medium makes use of public and private keys in order to form a digital signature that ensures security. With the property of immutability embedded in blockchain, as an illustrative, non-limiting example of an immutable medium, it becomes easier to detect tampering of any data. Blockchains are considered tamper-proof as any unilateral change in even one single block can be detected. Once the majority of nodes in the network come to a consensus and agree to a common solution, the block is time stamped and which acts as a shared and distributed ledger for all confirmed and validated transactions.

As referred to herein, immutability means the ability of a transaction medium to remain practically infeasible to change, thus sustaining non-repudiation of transactions related thereto. An immutable medium, in embodiments here, includes a subset of storage media characterized by the presumed difficulty, after the fact, of altering or deleting data stored therein. In other words, it is considered infeasible to alter data stored on such immutable media without invalidating the data or the medium itself. In one illustrative and non-limiting example, immutability pertains to a blockchain to remain indelible, such that data in the blockchain cannot be altered. Each block of currency data record, such as transaction details, proceed in accordance with cryptographic principle or a hash value.

A currency artifact as referred to herein includes a legal tender, standard fiat currency unit as used and sanctioned by government authority and laws of one or more countries. The currency artifact can also encompass other non-standard negotiable digital payment amounts or instruments, in other embodiments.

An authentication seal as referred to herein is unique as generated during execution, for instance in a server computing device, of an authentication agent in conjunction with a given currency data record. The authentication seal as referred to herein further attests that an associated currency data record, which in some embodiments can be a document or similar data artifact, an indirect representation of which can be deployed to an immutable medium, is verified and acknowledged as authentic. A payor originator of the digital currency data record or document verifies and acknowledges the currency data record as authentic, in some embodiments.

As referred to herein, an immutable medium includes a subset of storage media characterized by the presumed difficulty, after the fact, of altering or deleting data stored therein. In other words, it is considered infeasible to alter data stored on such immutable media without invalidating the data or the medium itself. Blockchain nodes and Write Once Read Many (WORM) storage media are commonly referenced members of this set.

In accordance with a first example embodiment, provided is a computer-implemented method of transacting a digital payment instrument deploying an authentication seal. The computer-implemented process comprises receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record; associating, using one or more processors, at least one of the currency data record, the R-ID, the R-HSH and a payor agent signature with a unique identifier (B-ID) of a location within an immutable storage medium, the payor agent signature based on at least one of the payor agent signing key and the payor agent verification key; and transmitting, to the payor agent, an authentication seal in unique association with the currency data record, the authentication seal being generated, using the one or more processors, based at least in part upon the at least one of the currency data record and the R-ID, the R-HSH and the B-ID.

In one aspect, the immutable storage medium comprises at least one of a write once read many (WORM) storage medium and a blockchain node that is communicatively accessible to the authentication agent server device.

In an embodiment, the R-ID comprises a Nonce (Number Used Once) Identifier.

In an embodiment, the B-ID comprises at least one of a unique index, a pointer and an offset to a location within immutable storage medium. The submittal, in embodiments, is represented by data stored, in some representation, at such offset in the immutable medium.

In one aspect, the transmitting of the generated authentication seal to the payor agent is performed in context of a transfer transaction pertaining to the digital payment instrument from the payor agent to a recipient agent. In embodiments, the transfer transaction comprises an unencrypted transmission in accordance with a non-secure transmission channel.

In a further aspect, the recipient transacts a further transfer of the transferred digital payment instrument to a subsequent payee agent.

In one embodiment, the transfer transaction from payor agent to the recipient agent comprises an unencrypted transmission in accordance with a non-secure transmission channel.

In accordance with a second example embodiment, provided is a non-transitory storage medium storing a computer usable program product including instructions executable in one or more processors of a server computing device. The instructions, when executed in one or more processors, cause operations comprising receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record; associating, using one or more processors, at least one of the currency data record, the R-ID, the R-HSH and a payor agent signature with a unique identifier (B-ID) of a location within an immutable storage medium, the payor agent signature based on at least one of the payor agent signing key and the payor agent verification key; and transmitting, to the payor agent, an authentication seal in unique association with the currency data record, the authentication seal being generated, using the one or more processors, based at least in part upon the at least one of the currency data record and the R-ID, the R-HSH and the B-ID.

In some embodiments, the program instructions are stored in a computer-readable storage medium in a data processing system and are transferred over a network from a remote data processing system.

In related embodiments, the program instructions are stored in a computer-readable storage medium in a server data processing system, and downloaded over a network to a remote data processing system for use in a computer-readable storage medium associated with the remote data processing system, and further comprise program instructions to meter usage of computer usable code in response to a request for the usage, and generate one or more invoices based on the metered usage.

In accordance with a third example embodiment, provided is a server computing system comprising one or more processors, one or more computer-readable memories, one or more computer-readable storage devices, and program instructions stored on at least one of the one or more storage devices for execution by at least one of the one or more processors via at least one of the one or more memories. The instructions, when executed in the one or more processors, cause operations comprising receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record; associating, using one or more processors, at least one of the currency data record, the R-ID, the R-HSH and a payor agent signature with a unique identifier (B-ID) of a location within an immutable storage medium, the payor agent signature based on at least one of the payor agent signing key and the payor agent verification key; and transmitting, to the payor agent, an authentication seal in unique association with the currency data record, the authentication seal being generated, using the one or more processors, based at least in part upon the at least one of the currency data record and the R-ID, the R-HSH and the B-ID.

One or more embodiments described herein provide that methods, techniques, and actions performed by a computing device are performed programmatically, or as a computer-implemented method. Programmatically by way of software applications, as referred to herein, means through the use of code or computer-executable instructions. These instructions can be stored in one or more memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory. A server computing device as described herein utilizes processors, memory, and logic instructions stored on computer-readable medium. Embodiments described herein may be implemented in the form of computer processor-executable logic instructions or programs stored on computer memory mediums. In alternative implementations, at least some hard-wired logic circuitry, including integrated circuits, may be used in place of, or in combination with, the software logic instructions to implement examples described herein. Thus, the examples described herein are not limited to any particular combination of hardware circuitry and software logic instructions.

System Description

FIG. 1 illustrates, in an example embodiment, a system for generating an authentication seal. Server computing system or server device 101, also referred to herein as server 101, includes authentication seal logic module 105 embodied in accordance with computer processor-executable instructions stored within a non-transitory memory. Server 101 is in communication, via the Internet in an embodiment, with payor agent computing device 102a and immutable storage medium 104. Payor agent computing device 102a and recipient agent computing device 102b can be such as a desktop or laptop computing device in some embodiments, collectively storing or acquiring currency data records and their respective associated authentication seals. Payor agent computing device 102a can be communicatively linked via communication network 107 to recipient agent computing device 102b. Although communication network 107 is depicted as a single network, it is contemplated that multiple networks employing multiple interconnections may be utilized.

Figure 2:
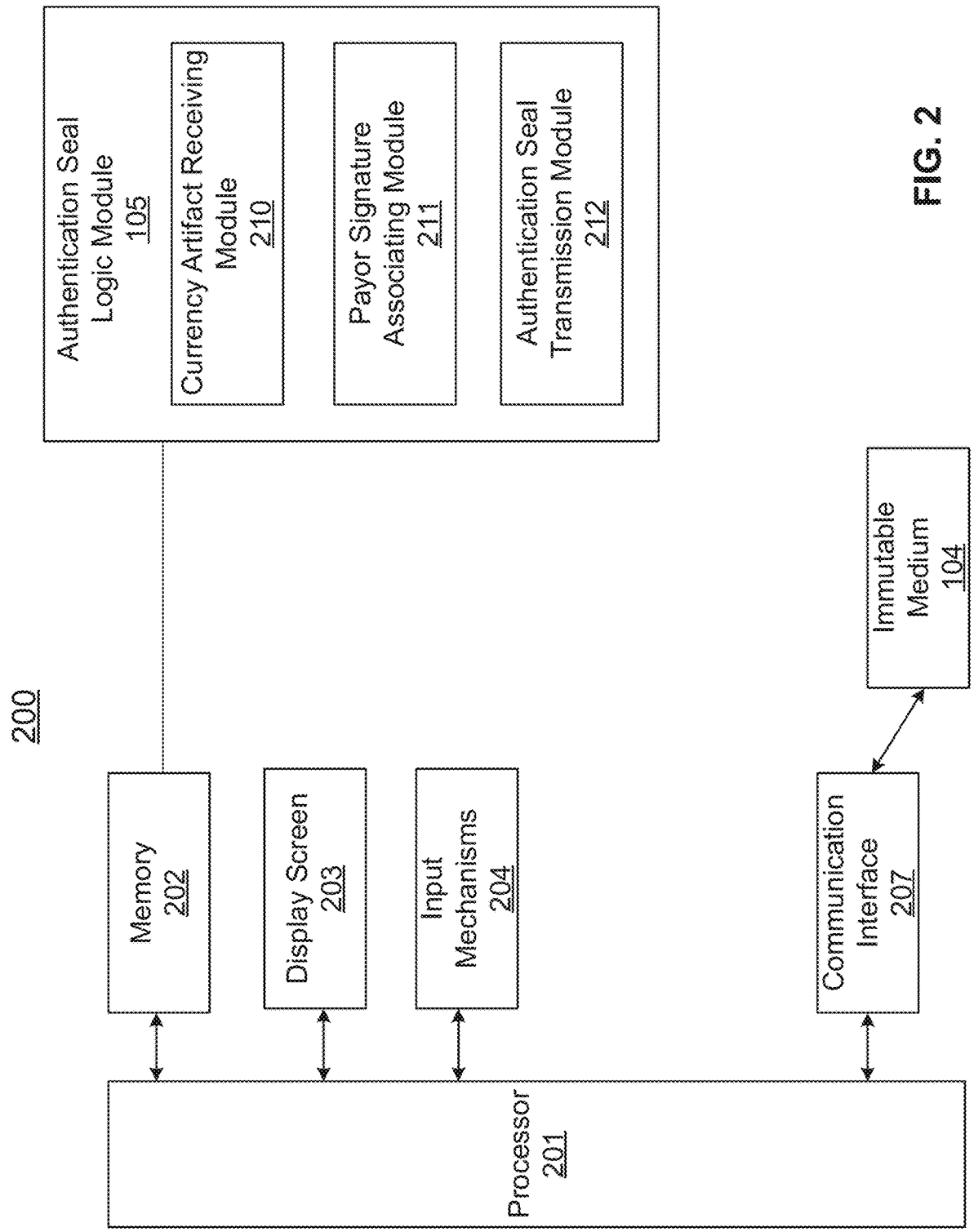
FIG. 2 illustrates, in one example embodiment, an architecture of a server computing device generating and transmitting an authentication seal deployable with a digital payment instrument.

FIG. 2 illustrates, in one example embodiment, an architecture of a server computing device generating and transmitting an authentication seal deployable with a digital payment instrument. Server computing system or device 101, also referred to herein as server 101, may include processor 201, memory 202, display screen 203, input mechanisms 204 such as a keyboard or software-implemented touchscreen input functionality, and communication interface 207 communicatively coupled with immutable storage medium 104. Memory 202 may comprise any type of non-transitory system memory, storing instructions that are executable in processor 201, including such as a static random access memory (SRAM), dynamic random access memory (DRAM), synchronous DRAM (SDRAM), read-only memory (ROM), or any combination thereof.

Authentication seal logic module 105 includes processor-executable instructions stored in memory 202 of server 101, the instructions being executable in processor 201. Authentication seal logic module 105 may comprise portions or sub-modules including currency artifact receiving module 210, payor signature associating module 211, and authentication seal transmission module 212.

Processor 201 uses executable instructions of currency artifact receiving module 210 to receive, at memory 202 of an authentication agent server computing device 105, a currency artifact submittal from a payor agent having an associated payor signing key and a payor verification key, the currency artifact submittal including at least an identifier (R-ID) and at least one of a currency data record and a record hash (R-HSH) of the currency data record, the R-ID being uniquely associated with the currency data record. The currency data record is sourced from, and submitted by, payor computing device 102, in an embodiment. The R-ID uniquely identifies a given currency data record. In an embodiment, the R-ID can be defined as a Nonce (Number Used Once) Identifier.

Processor 201 uses executable instructions stored in payor signature associating module 211 to associate, using the one or more processors, the R-ID, the R-HSH and a payor signature with a unique identifier (B-ID) of a location within an immutable storage medium, the payor signature based on at least one of the payor signing key and the payor verification key.

Processor 201 uses executable instructions stored in authentication seal transmission module 212 to transmit, to the payor agent, an authentication seal in conjunction with the currency data record, the authentication seal being generated based at least in part upon the at least one of the currency data record and the R-ID, the R-HSH and the B-ID. The information contained within the authentication seal, in embodiments, is sufficient to verify that this record is in fact an authentic payment order, in accordance with the digital payment instrument, issued by the payor agent to a payee agent in context of a transfer transaction.

Methodology

FIG. 3 illustrates a method of operation, in one example embodiment, of generating and transmitting an authentication seal deployable with a digital payment instrument. Method 300 embodiment depicted is performed by one or more processors 201 of server computing device 101. In describing and performing the embodiments of FIG. 3, the examples of FIG. 1 and FIG. 2 are incorporated for purposes of illustrating suitable components or elements for performing a step or sub-step being described.

Examples of method steps described herein relate to the use of server 101 for implementing the techniques described. According to one embodiment, the techniques are performed by authentication seal logic module 105 of server 101 in response to the processor 201 executing one or more sequences of software logic instructions that constitute authentication seal logic module 105.

In embodiments, authentication seal logic module 105 may include the one or more sequences of instructions within sub-modules including currency artifact receiving module 210, payor signature associating module 211 and authentication seal transmission module 212. Such instructions may be read into memory 202 from machine-readable medium, such as memory storage devices. In executing the sequences of instructions contained in currency artifact receiving module 210, payor signature associating module 211 and authentication seal transmission module 212 of authentication seal logic module 105 in memory 202, processor 201 performs the process steps described herein. In alternative implementations, at least some hard-wired logic circuitry, including integrated circuits, may be used in place of, or in combination with, the software logic instructions to implement examples described herein. Thus, the examples described herein are not limited to any particular combination of hardware circuitry and software logic instructions.

In embodiments, the payor agent's identity (C_VK) is associated to the R-ID and R-HSH and stored locally at payor device 102. The R-ID and R-HSH are then published, or broadcasted, by way of cryptographic operations, to the immutable medium. The offset (i.e. exact publication location) of this submittal is further associated to the prior association, resulting in the further association:

C_VK, R-ID, R-HSH, B-ID

This subsequently produced association is then incorporated into a digital signature, and then returned to the submitting payor as the authentication seal. In other embodiments, the payor agent's identity can be stored at server device 101, with a representation thereof also being stored in immutable medium 104.

At step 310, processor 201 executes instructions of currency artifact receiving module 210 to receive, at a memory of an authentication agent server computing device, a currency artifact submittal from a payor agent having an associated payor signing key and a payor verification key. The currency artifact submittal includes at least an identifier (R-ID) and at least one of a currency data record and a record hash (R-HSH) of the currency data record, the R-ID being uniquely associated with the currency data record. The hash, in one embodiment, can be a fixed-length hash, including but not limited to a 16- or 32-byte identifier, but other size configurations may be used. The R-ID uniquely identifies a given currency data record. In an embodiment, the R-ID can be defined as a Nonce (Number Used Once) Identifier. In embodiments herein, the C_VK and RID offer one level of uniqueness (identification) to a given currency data record, while their association with a BID provides yet another. In a case where two independent entities issue such a record, but both decide to use the same RID. There is no collision, because the RID is still unique to each C_VK. Further embodiments include a payor signature, or some other mechanism whereby the source/author/sender can be deterministically ascertained. In embodiments, R-HSH can refer to any data payload (i.e. the record itself), or any representation of the data such as a cryptographic hash thereof.

At step 320, processor 201 of server computing device 101 executes instructions included in payor signature associating module 211 to associate, using the one or more processors, at least the R-ID, the R-HSH and a payor signature with a unique identifier (B-ID) of a location within an immutable storage medium, the payor signature based on at least one of the payor signing key and the payor verification key.

In embodiments, some representation of the digital currency artifact submittal from the payor agent is stored at an offset location in the immutable medium. This storage operation can be either a) 'direct', in the sense that a complete copy of the data is stored at the offset in the immutable medium or b) 'representative', in the sense that a reversible transformation of the data is stored on the immutable medium at the offset or c) 'referential', in the sense that what is stored on the immutable medium could only feasibly have been generated by one or more cryptographic operations involving the original submitted data. Thus, in embodiments, the location pointed to, in immutable storage, contains some representation of the currency artifact submittal from the payor agent. In such example embodiments, using the immutable storage, the history of the transactions cannot be changed at will even by agreement between the payor and any subsequent recipient parties.

At step 330, processor 201 executes instructions included in authentication seal transmission module 212 to 212 to transmit, to the payor agent, an authentication seal in conjunction with the currency data record, the authentication seal being generated based at least in part upon the at least one of the currency data record and the R-ID, the R-HSH and the B-ID.

In embodiments, the R-ID comprises a Nonce (Number Used Once) Identifier.

In some embodiments, the B-ID comprises at least one of a unique index, a pointer and an offset to a location within the immutable storage medium.

In one aspect, transmitting of the generated authentication seal to the payor agent is performed in context of a transfer transaction pertaining to the digital payment instrument from the payor agent to a recipient agent. In embodiments, the transfer transaction comprises an unencrypted transmission in accordance with a non-secure transmission channel.

In a further aspect, the recipient transacts a further transfer of the transferred digital payment instrument to a subsequent payee agent. In such embodiments, a recipient agent, or each successive and subsequent payee agent, needs in order for the payee to "spend" his digital payment transfer:
   the authentication seal having a pointer to the immutable storage location; and
   a public key of the Payor agent, as embedded in the authentication seal. It is contemplated that such digital payment instruments disclosed here may advantageously use such currency artifact as a means to enable underbanked populations with the ability to receive and store negotiable payment instruments, where they would be able to trade closer to par.

In some embodiments, the transfer transaction from payor agent to the recipient agent can comprise an unencrypted transmission in accordance with one or more non-secure transmission channels, as the transfer need not be encrypted, the authentication seal providing an inherent guarantee of integrity and authenticity for the transfer transaction and currency data record. The digital payment instruments proposed herein meet or exceed many of the requirements of existing paper alternatives, and are also capable of supporting various messaging standards, including but not limited to CPA-005 or SWIFT's MT/MX which facilitate electronic transfers today.

Embodiments of the disclosure herein may also be delivered as part of a service engagement with a business entity. Aspects of these embodiments may include configuring a computer system to perform, and deploying software, hardware, and web services that implement, some or all of the methods described herein. Aspects of these embodiments may also include analyzing a payor's operations, creating recommendations based on the analysis, building systems that implement portions of the embodiments disclosed herein, integrating the systems into existing processes and infrastructure, metering usage of the systems, allocating expenses to users of the systems, and billing or invoicing based on usage of the systems.

Embodiments disclosed herein may include a system, a method, and/or a computer program product at any technical detail level of integration. The computer program product may include a computer readable storage medium (or any non-transitory media) having computer readable program instructions thereon for causing a processor to carry out aspects of the embodiments disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, does not constitute transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

In some embodiments, the program instructions are stored in a computer-readable storage medium in a data processing system and are transferred over a network from a remote data processing system.

In related embodiments, the program instructions are stored in a computer-readable storage medium in a server data processing system, and downloaded over a network to a remote data processing system for use in a computer-readable storage medium associated with the remote data processing system, and further comprise program instructions to meter usage of computer usable code in response to a request for the usage, and generate one or more invoices based on the metered usage.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of the present invention.

Aspects of the embodiments disclosed are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Such computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams of the FIGS. 1-3 herein illustrate the architecture, functionality, and operation of possible implementations of systems, methods, and computer program products according to various embodiments disclosed herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures herein. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is contemplated that embodiments described herein extend to individual elements and concepts described herein, as well as for embodiments to include combinations of elements recited anywhere in this application. Although embodiments are described in detail herein with reference to the accompanying drawings, it is to be understood that the invention is not limited to only such example embodiments. As such, many modifications and variations will be apparent to practitioners skilled in the art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventors from claiming rights to such combinations.

What is claimed is:

1. A computer-implemented method of transacting a digital payment instrument deploying an authentication seal, the computer-implemented process comprising:

receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record;

associating, using one or more processors, at least one of the currency data record, the R-ID, the R-HSH and a payor agent signature with a unique identifier (B-ID) of a location within an immutable storage medium, the payor agent signature based on at least one of the payor agent signing key and the payor agent verification key; and transmitting, to the payor agent, an authentication seal in unique association with the currency data record, the authentication seal being generated, using the one or more processors, based at least in part upon at least one of (i) the currency data record and the R-ID, (ii) the R-HSH and (iii) the B-ID.

2. The computer-implemented method of claim 1 wherein the immutable storage medium comprises at least one of a write once read many (WORM) storage medium and a blockchain node that is communicatively accessible to the authentication agent server device.

3. The computer-implemented method of claim 1 wherein the R-ID comprises a Nonce (Number Used Once) Identifier.

4. The computer-implemented method of claim 3 wherein the B-ID comprises at least one of a unique index, a pointer and an offset to a location within the immutable storage medium.

5. The computer-implemented method of claim 1 wherein transmitting of the generated authentication seal to the payor agent is performed in context of a transfer transaction pertaining to the digital payment instrument from the payor agent to a recipient agent.

6. The method of claim 5 wherein the transfer transaction comprises an unencrypted transmission in accordance with a non-secure transmission channel.

7. The method of claim 5 wherein the recipient transacts a further transfer of the transferred digital payment instrument to a subsequent payee agent.

8. A computer usable program product comprising one or more non-transitory computer-readable storage media, and program instructions collectively stored on at least one of the one or more non-transitory computer-readable storage media, the program instructions when executed in one or more processors causing operations comprising:
receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record;
associating, using one or more processors, at least one of the currency data record, the R-ID, the R-HSH and a payor agent signature with a unique identifier (B-ID) of a location within an immutable storage medium, the payor agent signature based on at least one of the payor agent signing key and the payor agent verification key; and
transmitting, to the payor agent, an authentication seal in unique association with the currency data record, the authentication seal being generated, using the one or more processors, based at least in part upon at least one of (i) currency data record and the R-ID, (ii) the R-HSH and (iii) the B-ID.

9. The computer usable program product of claim 8, wherein the R-ID comprises a Nonce (Number Used Once) Identifier.

10. The computer usable program product of claim 9, wherein the B-ID comprises at least one of a unique index, a pointer and an offset to a location within the immutable storage medium.

11. The computer usable program product of claim 8 wherein the transmitting of the generated authentication seal to the payor agent is performed in context of a transfer transaction pertaining to the digital payment instrument from the payor agent to a recipient agent.

12. The computer usable program product of claim 11, wherein the transfer transaction from payor agent to the recipient agent comprises an unencrypted transmission in accordance with a non-secure transmission channel.

13. The computer usable program product of claim 8, wherein the stored program instructions are stored in a computer-readable storage medium in a data processing system, and wherein the stored program instructions are transferred over a network from a remote data processing system.

14. The computer usable program product of claim 13, wherein the stored program instructions are stored in a computer-readable storage medium in a server data processing system, and wherein the stored program instructions are downloaded over a network to a remote data processing system for use in a computer-readable storage medium associated with the remote data processing system, further comprising:
program instructions to meter usage of computer usable code in response to a request for the usage; and
program instructions to generate an invoice based on the metered usage.

15. A computer system comprising one or more processors, one or more computer-readable memories, one or more computer-readable storage devices, and program instructions stored on at least one of the one or more storage devices for execution by at least one of the one or more processors via at least one of the one or more memories, the program instructions when executed in the one or more processors causing operations comprising:
receiving, at a memory of an authentication agent server computing device, a currency artifact submittal from a payor agent having an associated payor agent signing key and a payor agent verification key, the currency artifact submittal including at least an identifier (R-ID) and at least one of a currency data record and a record hash (R-HSH) of the currency data record, the R-ID being uniquely associated with the currency data record;
associating, using one or more processors, at least one of the currency data record, the R-ID, the R-HSH and a payor agent signature with a unique identifier (B-ID) of a location within an immutable storage medium, the payor agent signature based on at least one of the payor agent signing key and the payor agent verification key; and
transmitting, to the payor agent, an authentication seal in unique association with the currency data record, the authentication seal being generated, using the one or more processors, based at least in part upon at least one of (i) the currency data record and the R-ID, (ii) the R-HSH and (iii) the B-ID.

16. The computer system of claim 15, wherein the immutable storage medium comprises at least one of a write once read many (WORM) storage medium and a blockchain node that is communicatively accessible to the authentication agent server device.

17. The computer system of claim 15, wherein the R-ID comprises a Nonce (Number Used Once) Identifier.

18. The computer system of claim 16, wherein the B-ID comprises at least one of a unique index, a pointer and an offset to a location within the immutable storage medium.

19. The computer system of claim 18 wherein transmitting of the generated authentication seal to the payor agent is performed in context of a transfer transaction pertaining to the digital payment instrument from the payor agent to a recipient agent.

20. The computer system of claim 18 wherein the transfer transaction comprises an unencrypted transmission in accordance with a non-secure transmission channel.

* * * * *